United States Patent [19]
Eiter et al.

[11] Patent Number: 5,830,292
[45] Date of Patent: Nov. 3, 1998

[54] HARD SOLDER

[75] Inventors: Johann Eiter, Breitenwang; Wolfgang Köck; Thomas Huber, both of Reutte, all of Austria

[73] Assignee: Schwarzkopf Technologies Corporation, New York, N.Y.

[21] Appl. No.: 796,608

[22] Filed: Feb. 7, 1997

Related U.S. Application Data

[62] Division of Ser. No. 418,483, Apr. 7, 1995, abandoned.

[30] Foreign Application Priority Data

Apr. 13, 1994 [AT] Austria .................................. A 754/94

[51] Int. Cl.$^6$ ...................................................... C21D 1/09
[52] U.S. Cl. ................................ 148/628; 429/12; 429/36
[58] Field of Search ..................................... 148/528, 423, 148/427; 419/8, 48, 49; 429/12, 36

[56] References Cited

U.S. PATENT DOCUMENTS

| | | | |
|---|---|---|---|
| 3,787,202 | 1/1974 | Mueller et al. | 420/428 |
| 4,857,695 | 8/1989 | Monden et al. | 219/85.22 |
| 4,913,752 | 4/1990 | Falk | 148/336 |
| 5,314,659 | 5/1994 | Hidaka et al. | 420/428 |
| 5,427,736 | 6/1995 | Ritter et al. | 419/48 |

FOREIGN PATENT DOCUMENTS

| | | |
|---|---|---|
| 0 110 418 | 2/1983 | European Pat. Off. . |
| 108 959 | 5/1984 | European Pat. Off. . |
| 185 954 | 7/1986 | European Pat. Off. . |
| 332 978 | 9/1989 | European Pat. Off. . |
| 3 732 749 | 4/1989 | Germany . |
| 59-035003 | 2/1984 | Japan . |
| 60-207252 | 10/1985 | Japan . |
| 1-228697 | 9/1989 | Japan . |
| 02132764 | 5/1990 | Japan . |
| 3-199337 | 8/1991 | Japan . |
| 4-221037 | 8/1992 | Japan . |
| 59-6352 | 1/1994 | Japan . |

OTHER PUBLICATIONS

Hansen, Max, *Constitution of Binary Alloys*, at 541–46 (McGraw–Hill Book Co. 1958).
Chemical Abstract No. 75–120841v, DE 1956186, May 13, 1971.
Chemical Abstract No. 97–76949q, 1982.
Chemical Abstract No. 103–11394c, 1984.
Chemical Abstract No. 104–73497t, JP60187494, Sep. 24, 1985.
Chemical Abstract No. 108–60867w , JP62228445, Oct, 7, 1987.
Chemical Abstract No. 112–122117v , 1989.
Chemical Abstract No. 114–231119j , JP03045807, Feb. 27, 1991.
Chemical Abstract No. 115–237060 , JP03058832, Mar. 14, 1991.
Chemical Abstract No. 116–111419b , 1990.
Chemical Abstract No. 119–165908 , Su 1743773, Jun. 29, 1992.
Chemical Abstract No. 120–251017b , US 99640, Jan. 1, 1994.

*Primary Examiner*—Sikyin Ip
*Attorney, Agent, or Firm*—Morgan & Finnegan, L.L.P.

[57] ABSTRACT

The invention relates to a hard solder for high-temperature soldered joints joining high temperature-resistant materials, especially chromium and alloys based on chromium. The hard solder consists of 40% to 70% by weight chromium, up to 2% by weight of one or several of the metals selected from the group of vanadium, niobium, tantalum, titanium, zirconium and hafnium, up to 2% by weight of one or several of the metals or their oxides selected from the group of rare earths and yttrium, as well as nickel as the balance. The solder according to the present invention is particularly suitable for joining by soldering parts in solid-electrolyte, high-temperature fuel cells.

7 Claims, No Drawings

HARD SOLDER

CROSS-REFERENCES TO RELATED APPLICATIONS

This application is a divisional application of application Ser. No. 08/418,483 filed Apr. 7, 1995, now abandoned.

BACKGROUND OF THE INVENTION

1. Field of the Invention

The present invention relates to a hard solder for high-temperature soldering operations joining high temperature-resistant materials, especially chromium and alloys based upon chromium.

2. Description of the Prior Art

Known solders for the hard soldering of such materials are hard solders such as zirconium, titanium, vanadium, or hard solders based on nickel, with up to about 20% by weight chromium content, and up to about 4% by weight boron and/or silicon content, which are used especially for soldering chromium or alloys based on chromium. In addition to boron and/or silicon, the last-mentioned solders may contain low contents of molybdenum and/or iron as well.

The known solders based on nickel are manufactured from powders, using a special melt-metallurgical process (melt spinning) for producing such solders in the form of amorphous foils, such solders being referred to as "rapidly solidified filler metals." The boron and/or silicon components in the solders serve the purpose of lowering the melting point, on the one hand, and of enhancing the wettability of the solder on the other hand.

A drawback in connection with the above-mentioned melt spinning process, however, is that the boron and/or silicon components cause the formation of intermetallic phases with undesirable hardness values or insufficient strength. Furthermore, because of their low chromium content, the known solders have a melting point of no greater than approximately 1200° C., which is inadequate in many applications.

Chemical Abstract 103-11394c describes the use of a Ni—Cr-alloy with up to 44% by weight chromium component for melting down porcelain in dental prosthetics. Chemical Abstract 108-60867w describes the use of a Ni—Cr-alloy with up to 50% by weight chromium component for objects that are exposed to corrosive stress. The use of such alloys as solder material for high-temperature soldered joints is not disclosed in either of these two earlier publications.

Chemical Abstracts 119-165908, 114-231119j, 112-122117v and 120-251017b describe solder alloys based on Ni—Cr, with a maximum chromium content of 30% by weight. Such solder alloys, however, are not suitable for high-temperature soldered joints of objects consisting of chromium, or of alloys based upon chromium.

SUMMARY OF THE INVENTION

To overcome the problems associated with the prior art, the present invention makes available a hard solder for high-temperature soldered joints, which, during the soldering process, does not cause any formation of embrittling intermetallic phases, and which permits the soldered materials to be exposed to operational temperatures of at least 1300° C.

According to the present invention, this and other problems are solved by providing a solder comprising 40% to 70% by weight chromium, up to 2% by weight of one or several metals selected from the group of vanadium, niobium, tantalum, titanium, zirconium and hafnium, up to 2% by weight of one or several metals and/or their oxides selected from the group of rare earths and yttrium, and the balance of which is nickel.

The foregoing specific object and advantage of the present invention is illustrative of those which can be achieved by the present invention and are not intended to be exhaustive or limiting of the possible advantages which can be realized. Thus, this and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

DETAILED DESCRIPTION OF THE INVENTION

The hard solder of the present invention preferably comprises 40% to 70% by weight chromium, up to 2% by weight of one or several metals selected from the group of vanadium, niobium, tantalum, titanium, zirconium and hafnium, up to 2% by weight of one or several metals and/or their oxides selected from the group of rare earths and yttrium, and the balance of which is nickel.

Unexpectedly, the solder according to the present invention excellently wets the materials to be joined even in the absence of boron and/or silicon components, and exhibits a well-controllable flow of the solder, which prevents the solder from exiting from the soldered gap and consequently avoids reworking of the parts joined by soldering. The solder is particularly suitable for joining chromium or chromium containing materials. However, other high-temperature-resistant materials, and particularly high-melting metals such as tungsten or molybdenum, graphite, and also ceramic materials such as SiC, TiC, $TiB_2$ and the like are highly suitable as well for being joined by soldering with application of the solder according to the present invention.

In addition to the above-mentioned properties, the solder according to the present invention exhibits high ductility, good thermal and electrical conductivity, as well as excellent resistance to corrosion.

By using one or several of the metals selected from the group of vanadium, niobium, tantalum, titanium, zirconium and hafnium in amounts of up to 2% by weight, the ductility of the solder can be enhanced further without any notable negative influence on the other favorable attributes.

An improvement of the solder with respect to its resistance to corrosion caused by hot gases is achieved by adding rare earths, yttrium and/or their oxides in amounts of up to 2% by weight.

A solder with 50% by weight chromium and the balance nickel has been found to be particularly advantageous.

Preferably, the solder is used in the form of thin foils with a sheet thickness between 50 and 200 $\mu$m.

Advantageously, the foils are manufactured by powder-metallurgical processes. In a particularly preferred process, a compact is produced by mixing, pressing and sintering of the powdery starting materials. Subsequently, the compact is encased airtight and the encased compact is hot-rolled to a sheet thickness of approximately 2 mm. Following removal of the encasing material, the sheet is cold-rolled to the desired sheet thickness. In addition to the sheet form, the solder according to the present invention may be manufactured in the form of wire as well.

The solder according to the present invention has been successfully used, especially for soldering parts in solid electrolyte, high-temperature fuel cells (SOFC fuel cells). With such fuel cells, a ceramic solid electrolyte based upon $ZrO_2$ is used, which is connected to metallic electrodes on both sides, whereby oxygen is supplied on one electrode and the fuel on the other. In addition to hydrogen, hydrocarbons are suitable fuels for SOFC fuel cells as well.

In the manufacture of SOFC fuel cell modules, several series-connected fuel cells—which are arranged one flat on top of the other—may be interconnected by way of so-called bipolar plates, whereby the bipolar plate electrically/conductively connects the cathode of the one cell to the anode of the adjacent cell.

Alloys based upon chromium are used as the preferred materials for the bipolar plates, as well as for other components of the high-temperature fuel cells. The individual parts of such fuel cells are advantageously joined with each other by soldering, whereby the solder is expected to meet a great number of different requirements. For example, the solder has to exhibit good thermal and electrical conductivity; the coefficient of thermal-expansion has to be as close as possible to that of the ceramic electrolyte and of the metallic parts; and most of all, it has to be resistant to corrosion vis-a-vis the hot gases such as air and hydrogen, as well as hydrocarbons.

The solder according to the present invention satisfies each one of the above-mentioned properties in an excellent way, so that it is especially suitable for this special case of application.

The present invention is explained in greater detail below in the following examples.

EXAMPLE 1

For the manufacture of a bipolar plate for a high-temperature fuel cell, several sheets comprising a chromium alloy with 5% by weight iron and 1% by weight yttrium oxide are joined to each other using the solder according to the present invention. The dimension of each sheet is 200×200 mm with a sheet thickness of 2 mm. To join the sheets with one another, the sheets are cleaned in the ultrasound bath. Thereafter, the soldering structure is arranged using three sheets stacked one on top of the other. Solder foils consisting of 50% by weight nickel and 50% by weight chromium and with a layer thickness of 0.075 mm are positioned between each pair of sheets.

The soldering structure is loaded with weights, about 20 to 40 $g/cm^2$, and charged in a soldering furnace. Soldering is carried out in a hydrogen atmosphere. The soldering furnace is heated within 2 hours and 30 minutes from room temperature to 1350° C., and maintained at the latter temperature for 5 minutes. Thereafter, the structure is cooled to room temperature within 3 hours.

A nondestructive testing of the soldered composite demonstrated a flawless condition of the soldered joint between the individual sheets. No solder material had exited from the soldering gaps so that no reworking of the bipolar plate was required.

A bipolar plate so produced was thereafter installed in a SOFC-fuel cell and tested. After the fuel cell had operated approximately 1000 hours, no cracks of any type or negative effects of corroding influences were found on the bipolar plate.

EXAMPLE 2

To manufacture a solder foil comprising the composition 50% by weight chromium and the balance nickel, 5 kg chromium powder with an average grain size of 30 μm, and 5 kg nickel powder with an average grain size of 3 μm are mixed together. The powder mixture is thereafter compressed with a pressing pressure of 3 $t/cm^2$ to obtain a compact having the dimensions 25×170×400 mm. The compact is sintered for 6 hours at a temperature of 1200° C. and subsequently encased airtight by welding in a steel jacket having a wall thickness of 2 mm, following evacuation of the jacket. The encased sintered compact is hot-rolled to a thickness of 2 mm at a temperature of 1200° C. Following chemical removal of the steel jacket, the sheet is ground and cold-rolled to a foil thickness of 50 μm.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

We claim:

1. A process for joining high temperature-resistant parts in solid-electrolyte high-temperature fuel cells, said parts being made of chromium or alloys based upon chromium, the process comprising the steps of:
   (a) applying a hard solder between the high temperature-resistant parts, the hard solder consisting essentially of:
      (1) 40% to 70% by weight chromium;
      (2) up to 2% by weight of at least one of the metals selected from the group consisting of vanadium, niobium, tantalum, titanium, zirconium and hafnium;
      (3) up to 2% by weight of at least one of the metals or their oxides selected from the group consisting of rare earths and yttrium; and
      (4) the balance being nickel;
   (b) heating the hard solder and high temperature-resistant parts; and
   (c) cooling the heated hard solder and high temperature-resistant parts to create a high-temperature soldered joint connecting the high temperature-resistant parts.

2. The process for joining high temperature-resistant parts according to claim 1, wherein the hard solder consists essentially of at least 50% by weight chromium and the balance being nickel.

3. The process for joining high temperature-resistant parts according to claim 2, wherein the hard solder is a ductile foil.

4. The process for joining high temperature-resistant parts according to claim 3, wherein the hard solder is manufactured comprising the following steps:
   (a) mixing, pressing and sintering of a powdery starting material to form a compact;
   (b) airtightly encasing the compact;
   (c) hot-rolling the encased compact to a sheet thickness of about 1 to 3 mm; and
   (d) cold rolling the sheet to the desired foil thickness.

5. The process for joining high temperature-resistant parts according to claim 1, wherein the hard solder is a ductile foil.

6. The process for joining high temperature-resistant parts according to claim 5, wherein the hard solder is manufactured comprising the following steps:

(a) mixing, pressing and sintering of a powdery starting material to form a compact;

(b) airtightly encasing the compact;

(c) hot-rolling the encased compact to a sheet thickness of about 1 to 3 mm; and (d) cold rolling the sheet to the desired foil thickness.

7. A process for the manufacture of a bipolar plate for a solid-electrolyte, high-temperature fuel cell from sheets of a chromium alloy with 5% by weight iron and 1% by weight yttrium oxide, comprising the steps of:

(a) cleaning said sheets in an ultrasound bath;

(b) stacking said sheets one on top of the other;

(c) placing a solder foil comprising 50% by weight nickel and 50% by weight chromium between each pair of stacked sheets;

(d) loading the stacked sheets and solder foil with weights;

(e) heating the stacked sheets and solder foil in a soldering furnace from room temperature to 1350° C. within 2 hours and 30 minutes;

(f) maintaining the heated sheets and solder foil at 1350° C. for 5 minutes; and (g) cooling the heated sheets and solder foil to room temperature within 3 hours.

\* \* \* \* \*